July 22, 1930.  C. J. VEALE  1,770,957
ALIGNING DEVICE FOR DRIVEN BELTS
Filed Jan. 6, 1928  2 Sheets-Sheet 1

Inventor
Charles J. Veale,
By
Attorney

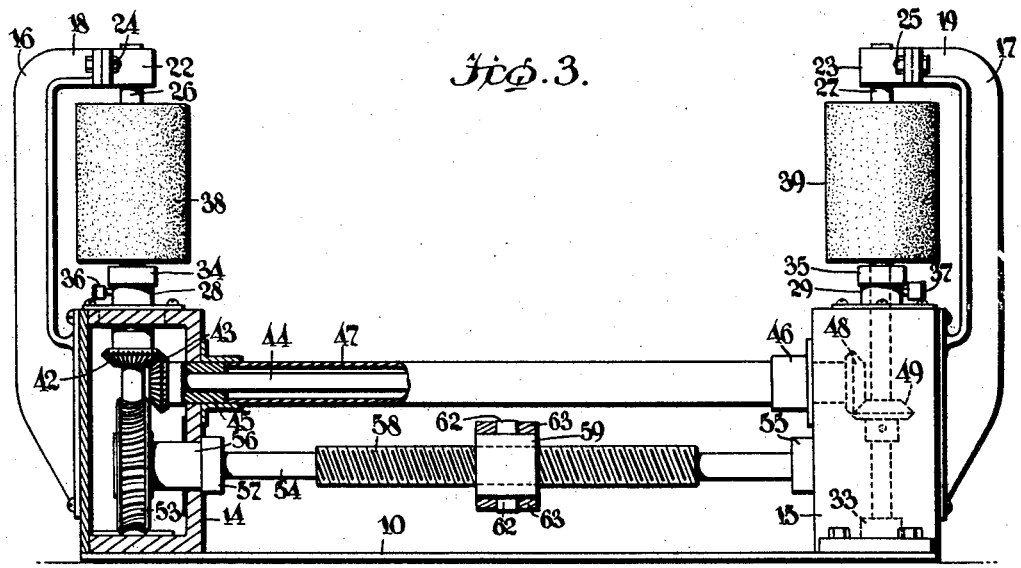
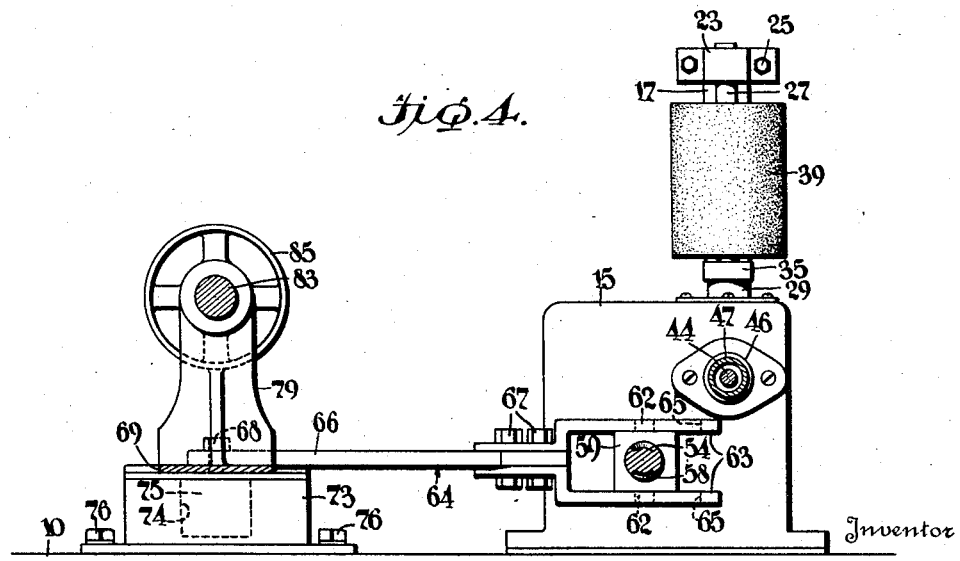

Patented July 22, 1930

1,770,957

UNITED STATES PATENT OFFICE

CHARLES J. VEALE, OF PACHUCA, MEXICO

ALIGNING DEVICE FOR DRIVEN BELTS

Application filed January 6, 1928. Serial No. 244,927.

My invention relates to controlling apparatus employed in conjunction with belts or conveyors, and it has particular relation to an apparatus for maintaining such belts or conveyors in predetermined alignment during their operation.

One object of my invention is to provide an aligning device which is automatically operable in conjunction with a driven belt or like instrumentality.

Another object of my invention is to provide an aligning device which involves relatively low operating expenses and relatively small outlay of equipment for the installation thereof.

Another object of my invention is to provide an aligning device for driven belts which is mechanically simple, rugged in construction, and whose upkeep is practically negligible.

Heretofore, belts, such as transmission belts, and particularly conveyor belts, as a general rule, have been maintained in proper alignment with pulleys that support them, by means of idler pulleys mounted immediately adjacent the edges of the belt which prevent the latter from moving laterally beyond the limits of a path defined by the pulleys. However, these pulleys did not operate to return the belt to its normal and proper path of movement. Consequently, improper functioning of the belts or conveyors resulted. Also, the operation of the belts out of alignment against the guiding pulleys was likely to cause injury to the belt, as well as to the belt supports.

The principal aim of my invention is to obviate the disadvantages encountered in the operation of previously known types of belt aligners by providing an automatically operable aligning device which includes a plurality of pulleys mounted adjacent opposite edges of a conveyor belt, and a mechanism operatively connected to the pulleys for guiding the belt back to its normal aligned position in the event it moves laterally in either direction during its course of operation. The mechanism comprises a reversible train of gearing that is attached to a screw-threaded shaft disposed transversely of the path of the conveyor or belt. A movable block threaded upon the shaft is connected to a pair of devices mounted upon turntables between the upper and lower reaches of the belt, and which are provided with rollers supporting portions of the belt. This pair of devices is adapted to be so actuated as to assume various angles with respect to the direction of travel of the conveyor belt. Connections between the various elements are so arranged that engagement of either edge of the belt with one of the pulleys immediately sets the mechanism in motion to swing the rollers supporting portions of the belt until they are disposed obliquely thereto, thereby causing the belt to return to its normal position.

In addition to the ordinary requirements for maintaining a belt in proper alignment, a very exact alignment is also important where scales are employed over which the conveyors pass and weights of the material transported are registered almost continuously. Without proper alignment of the conveyor belt with the scales incorrect weights will be recorded. My invention is peculiarly adapted to insure such exact alignment of conveyor belts.

For a better understanding of my invention, reference may now be had to the accompanying drawings, forming a part of this specification, of which:

Fig. 3 is a view, partially in elevation and partially in cross-section, of a portion of a belt aligning device, the view being taken substantially at right angles to the view shown by Fig. 2; and Fig. 4 is a cross-sectional view of a portion of the device shown by Fig. 1, the view being taken substantially along the line IV—IV thereof.

Figures 1, 2:
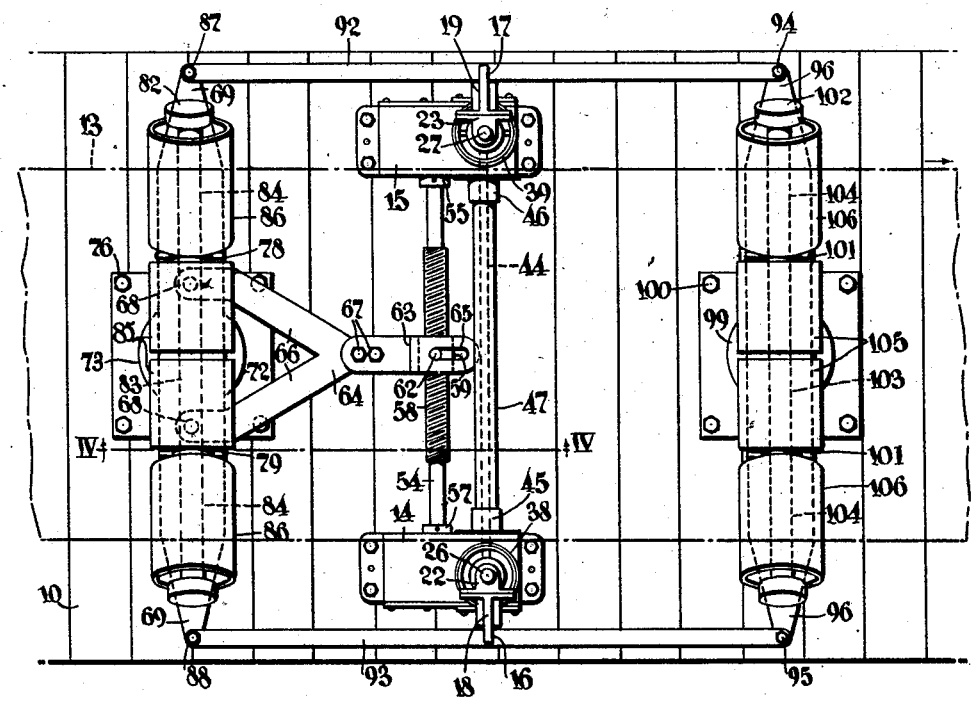
Fig. 1 is a plan view of a device embodying my invention.
Fig. 2 is a side elevational view of the device shown by Fig. 1.

In practicing my invention I provide a base or platform 10 which is supported between the upper and lower reaches 11 and 12 of a driven conveyor belt 13 traveling in the direction indicated by the arrows shown in Figs. 1 and 2. A pair of housings 14 and 15 mounted upon the platform adjacent the opposite edges of the conveyor belt rigidly support vertically disposed brackets 16 and 17 having angular portions 18 and 19, that are provided with journal bearings 22 and 23 rigidly secured thereto, as indicated at 24 and 25, respectively.

A pair of vertically disposed shafts 26 and 27, having their upper end portions journaled in the bearings 22 and 23, are provided with intermediate bearings 28 and 29 at the upper portions of the housings 14 and 15, respectively, and pivot bearings 32 and 33 in the lower portions of the housings support the lower portions of the vertically disposed shafts. Dust-proof caps 34 and 35 and grease cups 36 and 37 are provided for the purpose of insuring proper functioning of the bearings 28 and 29.

It will be observed that the bearings 22 and 23 overlie the housings 14 and 15, and that pulleys 38 and 39 are rigidly secured to the shafts axially thereof between the bearings 22—28 and 23—29, respectively. The surfaces of the pulleys are covered with layers of rubber or other substances having similar characteristics.

A beveled gear 42 rigidly secured to the shaft 26, meshes with a similar beveled gear 43, that is rigidly secured to one end of a horizontally disposed reversible shaft 44, having supporting bearings 45 and 46 in the housings 14 and 15, respectively. A tubular housing 47 extending between the bearings 45 and 46 provides a protective covering for the shaft. The other end of the shaft 44 is provided with a beveled gear 48, rigidly secured thereto, which meshes with a beveled gear 49 rigidly supported upon the vertically disposed shaft 27. By referring to Fig. 3, it will be apparent that the beveled gears 42—43 and 48—49 are so arranged that the rotation of the pulley 38 and the shaft 26 in one direction, will cause concurrent rotation of the pulley 39 and the shaft 27 in the opposite direction, and vice versa.

The lower portion of the shaft 26 is provided with an integral worm 52, meshing with a worm gear 53, that is rigidly supported upon one end of a horizontally disposed shaft 54. The other end of the shaft is journaled in a bearing 55 rigidly secured to the housing 15. Likewise, a bearing 56 mounted upon the housing 14 rotatably supports the portion of the shaft that is adjacent the worm gear 53. A collar 57 abutting the housing and rigidly secured upon the shaft, maintains the latter in its proper operative position, by preventing axial movement thereof.

An intermediate portion of the shaft 54 is screw-threaded, as indicated at 58, and a block 59, having oppositely disposed lugs 62 formed integrally thereon, is threaded upon the screw-threaded portion of the shaft 54. End portions 63 of an arm 64, normally disposed at right angles to the shaft 54, are provided with slots 65 within which the lugs 62 are confined. The other end portion of the arm 64 comprises forked members 66, that are rigidly secured by means of bolts 67 to the first mentioned end portions. The outer ends of the forked members 66 are rigidly secured, as indicated at 68, to an elongated plate 69, forming a portion of a turn-table 72. A suitable cylindrical base 73, having a bearing 74 therein, provides a seat for a bearing member 75 of the turn-table. Suitable securing means, indicated at 76, provide a rigid connection for the cylindrical member to the platform 10.

The upper portion of the turn-table comprises a pair of vertically disposed brackets 78 and 79, which support a shaft 82, having a central horizontally disposed portion 83 and two oppositely disposed sections 84 inclined downwardly toward the central portion. A central sectional or double roller 85 is journaled upon the section 83, and a pair of rollers 86 are journaled upon the inclined sections of the shaft 82.

The elongate plate 69 extends parallel to the central portion of the shaft 82 beyond the outer ends of the sections 84, and is pivotally connected, as indicated at 87 and 88 to the ends of parallel and relatively long links 92 and 93, respectively. The other ends of these links are pivoted, as indicated at 94 and 95, to the opposite ends of an elongate plate 96 corresponding in shape and arrangement to the plate 69. Likewise, the plate 96 is provided with a central cylindrical bearing 97, and a bearing member 98 formed upon the plate provides for pivotal mounting of a turn-table 99, similar to the turn-table 72. Suitable bolts 100 rigidly secure the cylindrical bearing 97 to the platform 10. The turn-table 99 includes vertically disposed brackets 101, which support a shaft 102 having a horizontal section 103 and oppositely disposed sections 104 inclined inwardly and downwardly toward the central portion. Rollers 105 and 106 are journaled upon the horizontal and inclined portions of the shaft, respectively.

The rollers 85—86 and 105—106 support portions of the conveyor belt and, through the actuation of the links 92 and 93 and the arm 64, they are swung concurrently about the bearings 75 and 98 by the pivotal movement of the turn-tables 72 and 99, according to the lateral direction in which the belt is to be guided.

In the event the conveyor belt tends to become disaligned and engages the vertically disposed pulley 38, the latter will be rotated, and the shaft 54 will also be rotated in such direction as to move the arm 64, and thereby cause the rollers 85—86 and 105—106 to swing about the bearings 75 and 98 until they are disposed obliquely with respect to the travel of the belt. When the rollers 85—86 and 105—106 assume the position just described the belt will be guided automatically back to its normally aligned position.

Likewise, in the event the edge of the conveyor belt engages the pulley 39, the operation of the shaft 54 and the arm 64 causes the rollers 85—86 and 105—106 to swing in the direction opposite that just described, and the conveyor belt will immediately be guided back to its proper aligned position.

The worm gears 52—53 are adapted to be located at either side of the conveyor belt, or a set of these elements can be employed to be operated independently by the respective rollers 38 and 39.

From the foregoing description it will be apparent that as soon as the conveyor belt tends to become disaligned in either direction, the mechanism described will operate automatically to guide it in its normal aligned path. Accordingly, an operator is not required to attend the device, except occasionally to provide lubrication therefor. The advantages of a device that operates upon such a basis of simplicity and efficiency will be obvious to those skilled in the art.

Although I have illustrated but one form which my invention may assume and described that form in detail, it will be apparent to those skilled in the art that the invention is not so limited, but that various modifications and changes may be made therein without departing from the spirit of the invention, or from the scope of the appended claims.

What I claim is:

1. An aligning device for a driven belt comprising a plurality of rotatable members disposed adjacent the edges of the belt, the axes of said rotatable members being stationary, a mechanism having gear connections to all of the members, a plurality of spaced means for supporting longitudinally spaced portions of the upper reach of the belt and connections between said means and said mechanism, said plurality of means being movable in response to engagement of the belt with the rotatable members for maintaining the belt in a predetermined path of movement.

2. An aligning apparatus for a driven belt comprising a plurality of rotatable members disposed adjacent the edges of the belt, a device including two spaced sets of rollers disposed transversely of and supporting portions of the belt, means connecting the sets of rollers, and a mechanism disposed transversely with respect to the belt and operatively connected to the rotatable members and to the device for actuating the rollers in response to engagement of the belt with the rotatable members.

3. An aligning apparatus for a driven belt comprising rotatable members supported adjacent the edges of the belt, the axes of the rotatable members being stationary, a movable belt-supporting device disposed transversely of the belt, a transversely disposed shaft having a driving connection to each of the rotatable members and a second transversely disposed shaft having a member movable axially thereon, the last mentioned member having driving connections to the rotatable members and to the belt-supporting device for moving the latter with respect to the belt.

4. An aligning device for a driven belt comprising a plurality of axially stationary rotatable members supported adjacent the edges of the belt, a device including rollers, the latter having their axes disposed transversely of the belt, said rollers providing a supporting trough-like configuration for insuring a like configuration of the belt supported thereon, a screw-threaded rotatable shaft having a block threaded thereon, means connecting the shaft to the rotatable members, an arm actuated by the block for altering the angularity of the rollers with respect to the belt, and operative connections between said device and the arm.

In witness whereof, I have hereunto signed my name.

CHARLES J. VEALE.